United States Patent

[11] 3,605,110

[72] Inventors David Conner Southward London; Peter Eric Smith, Caversham, both of England

[21] Appl. No. 785,951
[22] Filed Dec. 23, 1968
[45] Patented Sept. 14, 1971
[73] Assignee Audits of Great Britain Limited London, England
[32] Priority Jan. 4, 1968
[33] Great Britain
[31] 710/68

[54] EVENTS RECORDERS
14 Claims, 13 Drawing Figs.

[52] U.S. Cl. .......... 346/37, 346/59, 318/138, 179/2 AS
[51] Int. Cl. .......... H04n 7/02
[50] Field of Search .......... 346/37, 59; 325/31; 179/2 AS

[56] References Cited

UNITED STATES PATENTS

| | | | |
|---|---|---|---|
| 2,660,507 | 11/1953 | Cordell | 346/37 X |
| 2,965,433 | 12/1960 | Alpert et al. | 346/37 |
| 3,034,707 | 5/1962 | Jefferson | 346/37 X |

*Primary Examiner*—Joseph W. Hartary
*Attorney*—Stevens, Davis, Miller & Mosher

ABSTRACT: An events recorder comprising a clock provided by an intermittently energized stepping motor which is held in its stationary positions by its remanent magnetism, and, for television receiver monitoring, a pickup coil for picking up receiver line frequency to sense the beginning and end of viewing.

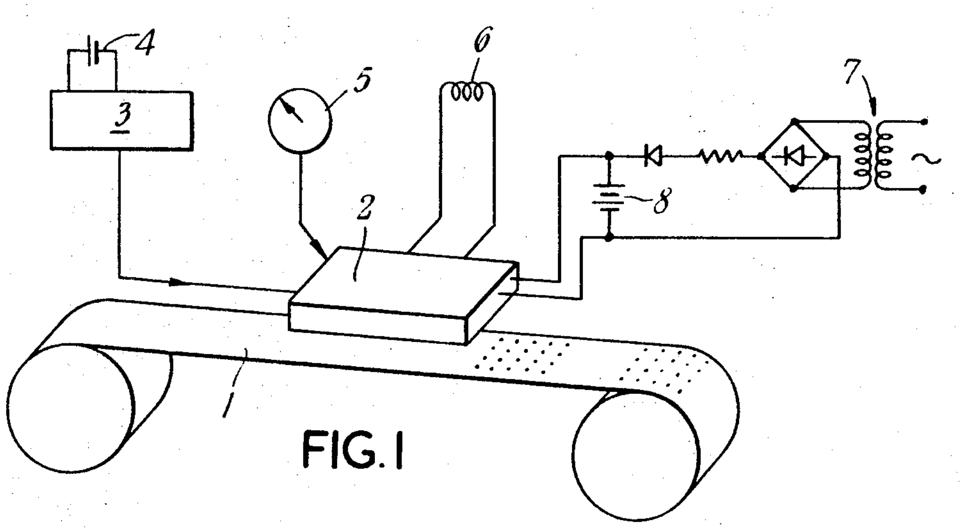
FIG. 1
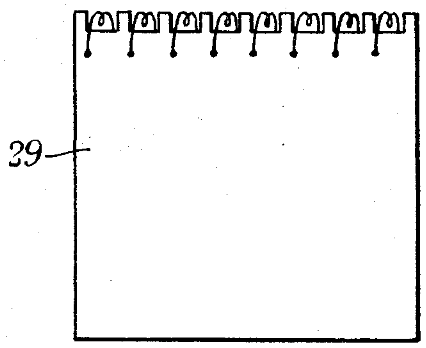
FIG. 3
FIG. 4
| V | | IV | | III | II | I | |
|---|---|---|---|---|---|---|---|
| 16 | | 4 | DAY | AM PM | | | |
| 8 | 3 WEEKS | 2 | OF THE | ↑ | | | |
| 4 | PERIODS | 1 | WEEK | | | | |
| 2 | | 8 | | MINUTES | | | |
| 1 | | 4 | HOURS | | | • | CHANNEL |
| 2 | 1 WEEK | 2 | | | | • | |
| 1 | PERIODS | 1 | | | | | |
| | | | | ↓ | • | • | |

PATENTED SEP 14 1971 3,605,110

SHEET 2 OF 8

EVENTS RECORDERS

This invention relates to stepping motor circuits, more especially for clock controlled events recorders, and to such recorders themselves.

Events recorders are devices for sensing changes in condition of an apparatus and for recording these changes and their times of occurrence. Such recorders have been proposed for determining audience use of wave signal receivers, such as television receivers. If an accurate record is to be kept, the clock of the recorder must be maintained in operation despite a power failure and recording must also be effective to make a record of the fact that receiver use has stopped. Accordingly, we propose a recorder having a standby battery for maintaining energization of the clock and the recording means. However, the current drain on the battery must be minimized to maximize the period of operation in the event of a power failure.

We propose that the clock be provided by a stepping motor driven by a clock pulse generator arrangement.

Conventionally, a stepping motor is of the synchronous type, having relatively movable magnetic circuit arrangements one of which has two magnetic circuits each with a winding arrangement having two windings. The two windings in each case are fed with two pulse trains of the same repetition rate, which are out of phase and which produce opposite current directions in the two windings. Any one winding receives unidirectional current pulses. The motor is energized even when it is stationary and stepping is achieved by redistributing the energizations between the windings.

In accordance with one aspect of the present invention there is provided in a method of operating a stepping motor with current pulses, the improvement which comprises stepping the motor by intermittent energization and holding the motor in its stationary positions by remanent magnetism in the intervals between energizations.

In accordance with another aspect of the present invention, we provide a stepping motor arrangement, wherein two pulse trains of current with the same repetition rate but different phase energize respective ones of said two magnetic circuits of the motor, in each pulse train the current pulses have alternating directions and the pulses have such a spacing that the pulses in one train occur within the intervals between the pulses of the other train so that the motor is intermittently energized and is held in its stationary positions by the remanent magnetism of the motor in the currentless intervals between energizations.

Accordingly, the motor is not continuously energized, whereby the drain upon the standby battery is minimized.

It is noted that the two windings of each magnetic circuit are treated as a single winding in which the current pulses alternately change direction.

The motor may thus have a clock pulse generator arrangement comprising a clock pulse generator, a first circuit for producing from the clock pulses two pulse trains differing in phase by about 90° and a second circuit for producing from the latter trains the two motor-energizing trains.

The first circuit is advantageously a two-stage twisted ring counter.

The second circuit is advantageously a differentiating circuit. The second circuit might comprise, for each winding arrangement, a capacitive voltage divider to an intermediate point of which one end of the associated winding arrangement is connected, the other end of that winding being connected to receive the associated one of the pulse trains from the first circuit.

Time information can be conveniently obtained from the motor by switch means driven by the motor to give a unique switching combination for each of a predetermined number of motor movements. The switch means might be angle encoders coupled to each other by pawl and ratchet mechanisms, for example, so that the encoders will complete one revolution in different times.

This arrangement enables one to obtain a measure of time in digital code for digital recording. Indeed, we prefer that all recording be effected in digital code, e.g. the changes being monitored and their times of occurrence will be recorded in digital multibit words.

It is known to have in events recorders a clock comprising a continuously running motor which continuously drives a recording medium, actual times being measured by measuring the lengths of recording medium utilized. This is a waste of recording medium obviated by our recorder.

Thus, a preferred embodiment of our recorder comprises recording means for recording said information on a recording medium, drive means for producing relative movement between the recording means and medium, clock means for giving a measure of actual time, and event input means coupled to the recording means and by which signals representing apparatus changes to be monitored can be introduced into the recorder, the recording means being such as to apply a record of said information and the corresponding time of occurrence in digitally coded words which are each represented in code as a combination of bits, and the drive means being operable independently of time and intermittently such that the changes in apparatus condition, together with their corresponding times of occurrence, will be recorded in code at respective sections of the recording medium.

Preferably binary code is used, but a ternary code might also have advantages, especially when using magnetic recording.

The drive means need only be operated to present new sections of recording medium to the recording means for respective pieces of information and to produce any relative motion necessary for the recording operation. Indeed the recording medium can be substantially stationary relative to the recording means during recording in some instances, for example when recording by burning marks on the recording medium.

The drive means does not operate as a function of time, as here-to-for, because time information is recorded digitally.

In one embodiment said drive means control recording such that, on a change in apparatus condition, the drive means will be operated to cause, in sequence, relative movement between the recording means and medium and recording by the recording means. Thus, the relative movement can immediately precede recording or immediately follow recording. Advantageously, the drive means will cause portions of the information to be recorded in sequence. For example, there may be a switch driven by the drive means to control the sequence of recording of the portions of information. A geneva mechanism may then be employed to couple the drive means for producing the relative movement between recording means and medium only during a portion of the switch operation which does not control recording.

It is also known to sense whether a wave signal receiver is "on" or "off" by means of a switch coupled to the receiver on-off switch. However, with the accuracy we achieve in measuring time, such a switch introduces an error in television receiver monitoring, because of the difference in time between the moment of switching on and the appearance of a picture.

This problem is obviated in accordance with a further aspect of the invention in which the switch is replaced by a pickup coil for picking up oscillations from the line circuit of the receiver, for example from the line output transformer.

For a better understanding of the invention and to show how the same may be carried into effect, reference will now be made, by way of example, to the accompanying drawings in which:

FIG. 1 is a highly diagrammatic representation of a monitoring apparatus for a television receiver;

FIG. 3 shows a bank of heating coils of the recording head of the chamber of FIG. 2;

FIG. 4 is a table illustrating the recording code of the apparatus;

Figure 2:
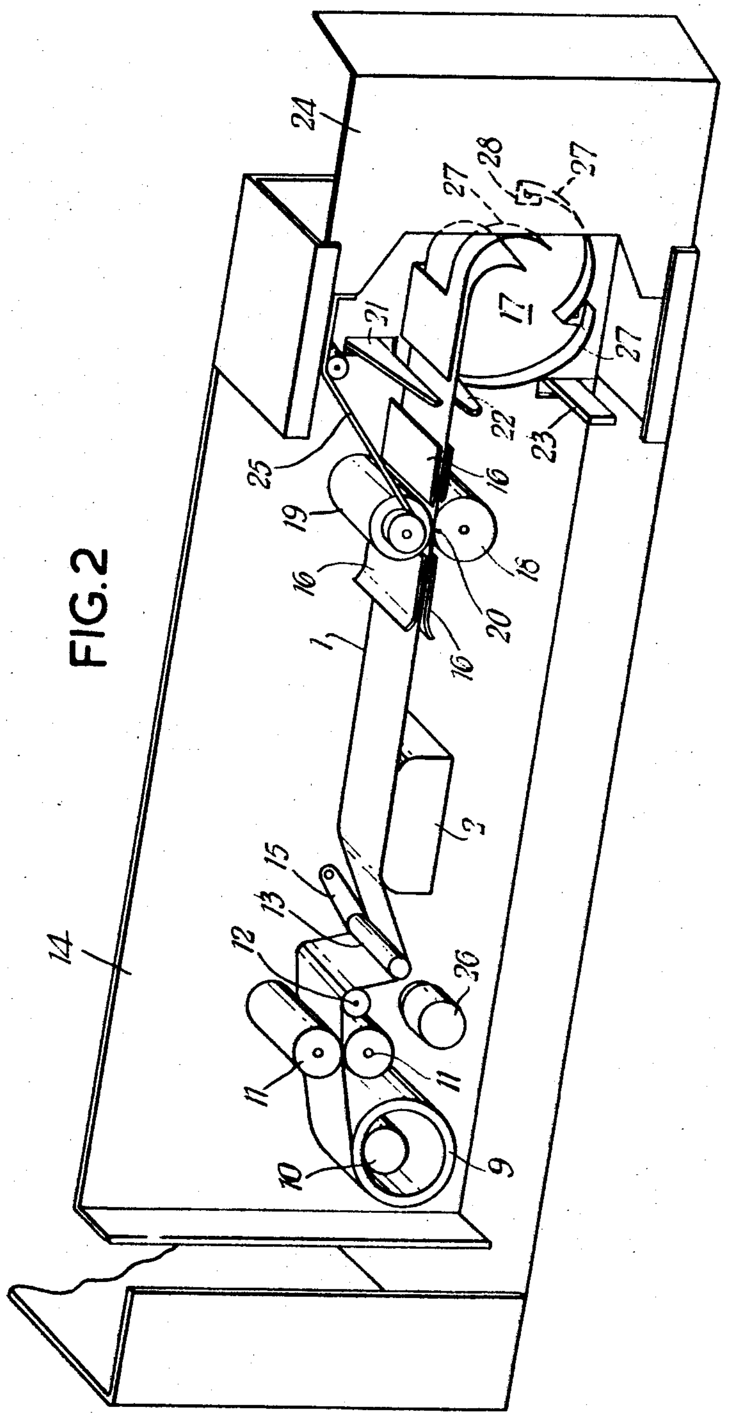
FIG. 2 shows a recording chamber of the device.

FIG. 1 shows diagrammatically a television audience-monitoring apparatus. The purpose of this apparatus is to sense whether a television receiver is "on" or "off," to record the time at which the transmission from "on" to "off" and from "off" to "on" takes place, to monitor the channel to which the receiver is tuned and to record the time at which a change of channel is made. For recording purposes, the apparatus comprises a recording tape 1 having a recording head 2 by which data in a binary digital code are stored on the tape with regard to the time at which a change in receiver condition occurs and to the channel to which the receiver is tuned when such a change has been made. In the present embodiment, the tape 1 is heat sensitive and the recording head 2 comprises plurality of heating coils which burn dots on the tape. Alternative recording techniques could be chosen. Thus, magnetic tape may be used, when a ternary code becomes possible.

Information as to actual time is obtained by a clock mechanism and circuit 3 driven by a replaceable Mallory cell 4 of 3.1 volts.

Information as to the channel to which the receiver is tuned is obtained from a switch 5 coupled to the receiver. As illustrated, the switch is a rotary switch and could thus be coupled to the tuning shaft of the receiver. There are other possibilities for obtaining this information, as will be mentioned in more detail hereinafter.

The apparatus is also fed with information as to when the receiver is switched on and off, and for this purpose there is a pickup coil 6 which will be positioned in the receiver so that it will have a voltage induced into it by the oscillations of the line circuit, e.g. by the current at the output of the line output transformer of the receiver. The arrangement is such that only when the line time base is operating is an appropriate signal induced to indicate that the set is on. This ensures that the on signal occurs virtually simultaneously with the occurrence of a picture on the television screen rather than simultaneously with the manual switching on of the receiver. This coil 6 can also be used to distinguish the use of the television receiver as such from the use of any FM radio that the receiver might also include. If necessary, measurement of the frequency of the voltage induced in the pickup coil can be used to detect whether a 625 line or a 405 line transmission is being received.

The power supply for the recording head and further items of the apparatus is obtained from an input transformer 7 which is to be connected to the mains independently of the television receiver. There is a standby battery 8 which becomes effective upon power failure and which is maintained in a charged state whilst the mains voltage is present. In the preferred embodiment, this battery is a Deac nickel cadmium battery of 7.2 volts, supplemented by a Deac battery of 3.6 volts. The arrangement is such that even if the receiver has been switched off and even if the mains fail, power supply is maintained to the apparatus. The various items of the apparatus will now be considered in turn.

FIG. 2 shows the recording tape and recording head chamber of the apparatus. The tape 1 is mounted, in the form of roll 9, on a shaft 10 and extends from the roll between guide rollers 11, over a fixed roller 12, under a member 13 and over the recording head 2. The member 13 is a plastics member which has a low coefficient of friction and which is nonrotatably mounted on a pivoted arm 15; it is urged downwardly by gravity and biases the tape onto the head 2. The tape passes from the recording head 2 between guide plates 16 to a tape-receiving space 17. A driver roller 18 and pinch roller 19 drive the tape along the desired path, these rollers acting directly on the tape at a gap 20 between the guide plates 16. Between the rollers 18 and 19 and the receiving space 17, the tape 1 passes between two cutter blades 21 and 22, the blade 22 being fixed while the blade 21 is mounted on a pivoted lever (not visible) which is at the far side of the back 14. The blade 21 is biased upwardly to a position spaced from the tape by a spring acting on the lever. The lever has an extension 23 which extends through the back 14 whereby the lever may be moved manually to lower the cutter blade 21 to sever the tape.

This recording chamber has a sliding door 24 coupled by a metal tape 25 to the pinch roller 19. On sliding the door 24 away from its closure position to the illustrated position, the metal tape, of spring steel, rotates the pinch roller in a sense such as to drive the tape into the tape-receiving space 17. When the door 24 has been fully opened, the recorded tape portions initially at the region adjacent the recording head 2 will be located within the space 17. The extension 23 may then be operated to sever the section of the tape in the space 17 from the clean section of the tape. The pinch roller 19 has a free wheel bearing arrangement whereby, during normal driving of the tape, the pinch roller 19 will free wheel relatively to the metal tape 25. The drive roller 18 also has a freewheel-bearing arrangement whereby it is free of its drive when it is being driven by the pinch roller 19 during opening of the door 24. The drive roller 18 is driven by a drive motor 26, the coupling from this motor to the drive roller 18 not being visible as it extends behind the back 14. The coupling includes a geneva mechanism for a purpose which will be described later.

The tape-receiving space 17 is defined by three arcuate and flexible metal members 27 each of which is secured at one end, as at 28, but which is otherwise free to flex. These arcuate members act as guides to guide the incoming tape into the form of a roll. These guides can also flex away from the center of the space to produce enlargement of the tape-receiving space as the roll in the space grows. The tape remaining in the chamber is automatically rethreaded into the space 17 when the apparatus is put into use after removal of used tape. The left-hand member 27 may have its free end lodged behind the cutter 22 (as illustrated) to ensure that the tape enters the space 17 and does not pass behind that left-hand member 27.

The recording head consists of five banks of eight heating coils, each bank extending transversely of the tape 1. Each bank is formed on a single plastics former having a number of upstanding fingers between adjacent pairs of which respective coils are mounted, as is illustrated in FIG. 3 which shows one bank of coils mounted on its former 29. In some of these banks, all eight coils are not utilized, but the banks are nevertheless constructed in an identical fashion for ease of bulk manufacture.

One possible code which can be applied to the tape by means of these heating coils is illustrated diagrammatically by a table in FIG. 4. The five banks are numbered I to V in the FIG., each bank being represented by a column of eight spaces corresponding to its eight coils. The eighth coil, at the bottom of the table, always provides a recording mark in the first and second banks for the purpose of identifying the beginning of a recording. The eight coils of the remaining banks are not utilized. The three coils in bank I adjacent the eight coil are utilized for recording in a binary digital code the channel selected, the code enabling up to seven channels to be recorded by these three coils. The remaining coils of banks I and II are utilized for recording in binary code the number allotted to the particular household concerned whereby the tape may be identified at a control station. The first seven coils of banks III, IV and V are used to record the actual time of occurrence of the receiver change being recorded. The first five coils of bank V are used to indicate the three week period in 21 possible three week periods, the sixth and seventh coils of bank V to indicate the week in the three week period concerned, the first three coils of bank IV to indicate the day of the week, the fourth to seventh coils of bank IV to indicate the hour at AM or PM, the first coil of bank III to indicate AM or PM and the second to seventh coils of bank III to indicate the number of minutes in the hour. All the information is recorded in binary digital code on the stationary tape. After this information has been recorded, and before a new recording is made, the tape is moved to advance a clean piece of tape adjacent to the recording head. This movement can be effected immediately before or immediately after each recording. In the preferred embodiment tape advance occurs immediately before recording.

FIGS. 5 to 8 illustrate the clock mechanism and circuit 3. The circuit is driven by a Smith's electronic pulse generator 30 emitting four pulses per second into the input of the clock circuit shown in FIG. 5. These pulses are amplified in a circuit comprising transistors T1 and T2 and are then fed along a line 31 to gating transistors T3, T6, T7 and T10 of two bistable circuits 32 and 33 comprising transistors T4 and T5 in one circuit and transistors T8 and T9 in the other. These circuits are coupled together in the manner of a twisted ring counter such that the output A of circuit 32 is coupled to the input A of circuit 33, the output $\overline{A}$ of circuit 32 to input $\overline{A}$ of circuit 33, the output B of circuit 33 to the input B of circuit 32 and the output $\overline{B}$ of circuit 33 to the input $\overline{B}$ of circuit 32.

Figure 6:
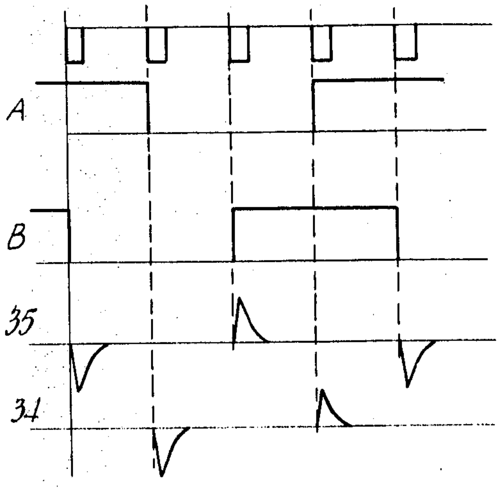
FIG. 6 shows wave forms occuring in the circuit of FIG. 5.

FIG. 6 is a diagram showing the waveforms occurring in this circuit. The upper waveform represents the strobe pulses sent along line 31 to the gates of the circuits 32 and 33. The waveforms marked A and B represent the outputs A and B respectively. Let it be assumed that when the first pulse has been fed to the gates, the transistors T3 and T4 are in their off condition, so that the output A is at about 6 volts, and that the transistors T9 and T10 are in their off condition, so that the output B is also at 6 volts. The outputs A and B are then at almost zero volts. When the second strobe pulse is fed to the gates, the transistor T3 is switched on so that the state of circuit 32 is changed and the output A becomes zero volts. No change occurs in the circuit 33 because transistor T8 is already on and transistor T10 cannot be switched on by the strobe pulse because of the potential applied at its base from the output $\overline{A}$ of circuit 32. This change of state of circuit 32 reverses the potentials at the bases of the gating transistors T7 and T10 of circuit 33, so that next time the strobe pulse occurs the stage 33 will change its state, whilst the circuit 32 will be unaffected. In consequence, the 90° out-of-phase waveforms at A and B are produced at the outputs A and B of these circuits. These waveforms are fed to respective windings 34 and 35 of a two-winding multipolar stepping motor 36 (FIG. 7) through amplifiers comprising transistors T12 to T15 and T16 to T19 respectively.

Figure 5:
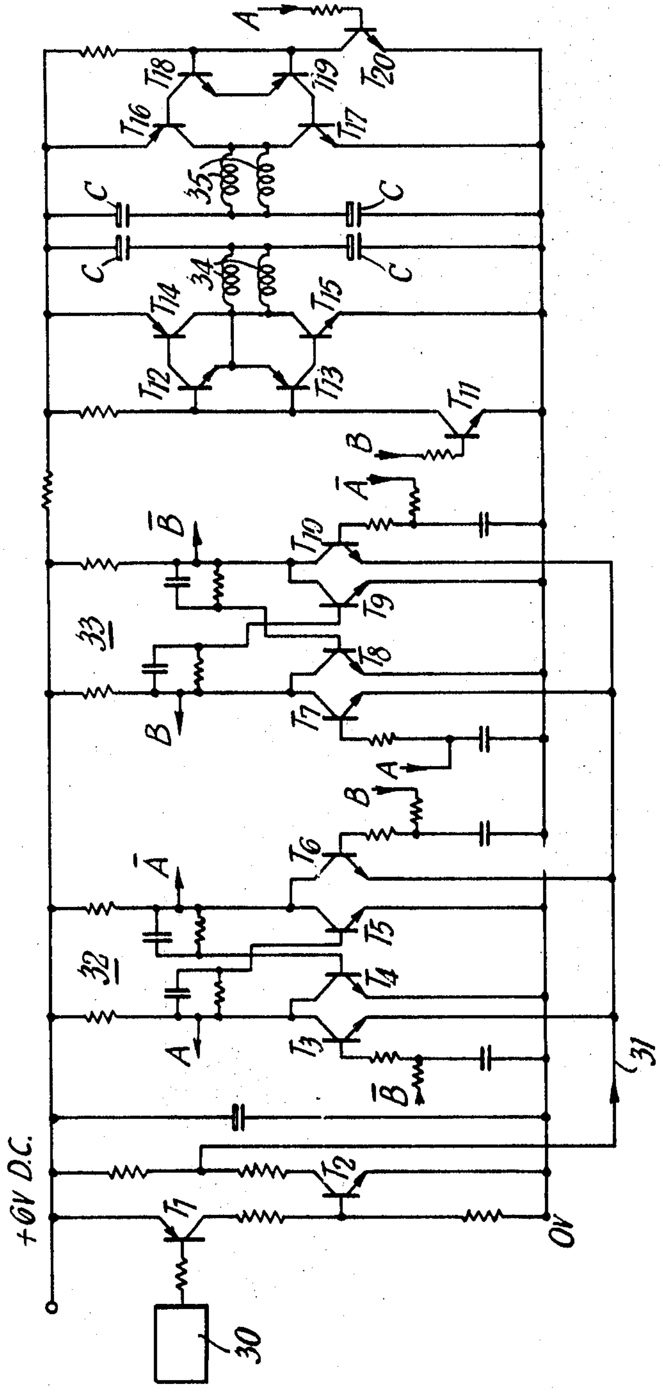
FIG. 5 is a diagram of a circuit for driving a stepping motor of a clock mechanism of the apparatus.

The circuits of FIG. 5 are normally supplied from the mains, but from the nickel cadmium 7.2 volt battery 8 upon a mains failure.

The waveforms supplied to the motor cause it to carry out four steps in each second. The motor is designed to carry out 48 steps per revolution and thus will carry out one twelfth of a revolution in one second.

Figure 7:
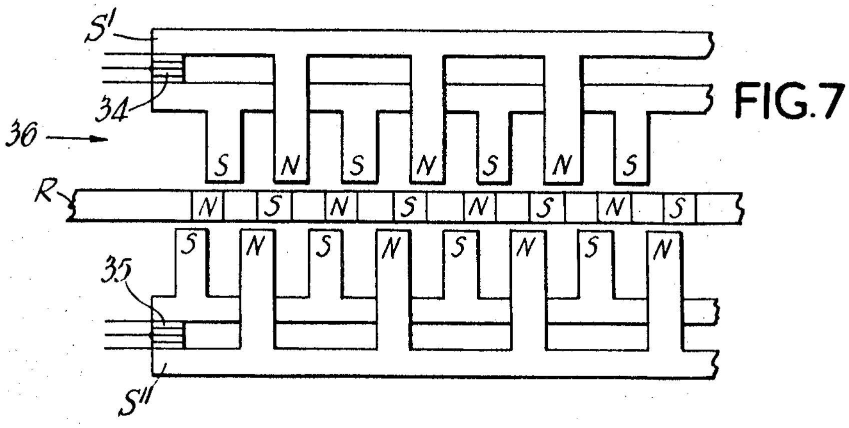
FIG. 7 is a diagram of the stepping motor.

FIG. 7 illustrates the stepping motor in linear form. It has a permanent magnet motor R with 12 pole pairs and two stators S′ and S″. The poles of stator S′ are one half of a pole pitch from those of the stator S″. The stators have respective energizing windings 34 and 35, which may each be formed as two windings connected together internally or externally of the motor. As shown in FIG. 5, each winding has its parts connected in parallel but a series connection might alternatively be employed.

Pulses (shown at 34 and 35 in FIG. 6) of alternate direction are delivered to each of these windings as a result of the charging and discharging of capacitors C connected in circuit with the windings. Each positive pulse fed to the windings occurs at the beginning of the corresponding pulse A and B and each negative pulse occurs at the end of the corresponding pulse A or B. The two pulse trains indicated at 34 and 35 in FIG. 6 are out of phase, in the present example by about 180° (or 90° relative to the period of pulses A and B). The capacitors and the windings thus act to differentiate the pulses A and B.

Each time a pulse is delivered the motor is stepped. In the interval between pulses, when there is no energization of the windings, the motor is stationary, being held in position by the remanent magnetism of the motor.

This differs from the conventional stepping motor operation in which current is continuously supplied, even to hold the motor in its stationary position. Consequently, the present arrangement drains less current than hitherto and this is significant in the present apparatus, because the operation of the clock upon a power failure depends upon a standby battery.

It is noted that in the conventional stepping motor operation, the winding halves are energized sequentially, while in the present case they are treated as one winding and are energized with alternating direction. Indeed, one winding half in each case could be disconnected.

Figure 8:
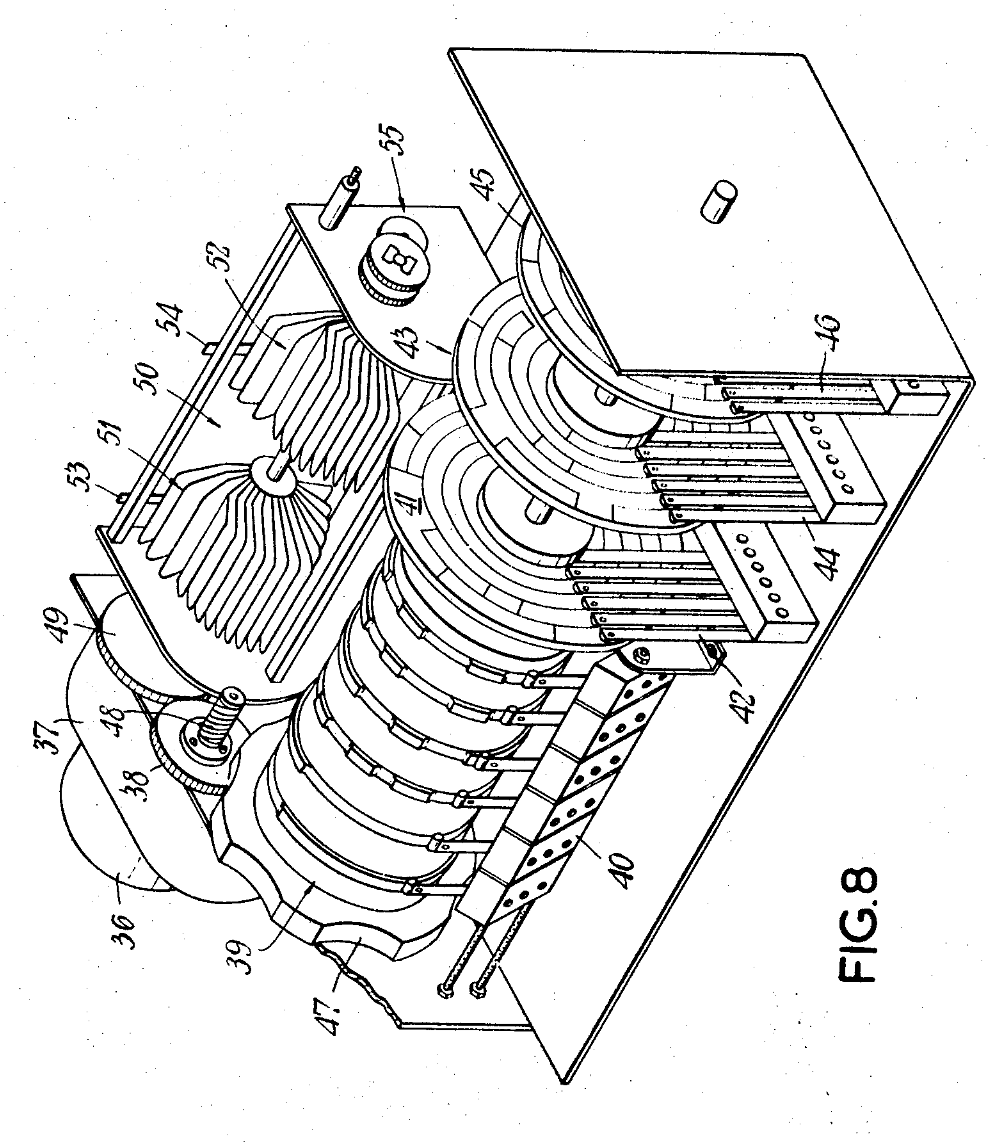
FIG. 8 is a perspective view of the clock mechanism.

FIG. 8 shows the clock mechanism including the stepping motor 36 which drives a gearbox 37 having a 300 to 1 reduction ratio whereby the output shaft of the gearbox will carry out one revolution in one hour. This output shaft is coupled by gears, only one of which is visible and is indicated at 38, to a cam drum 39 comprising six cam tracks. These cam tracks operate respective microswitches arranged in a bank 40 and are organized according to the Gray code whereby the operation of the six microswitches will be in accordance with a binary digital code. These switches are therefore coupled to the second to seventh heating coils of bank III. The cam tracks could alternatively be provided by respective cam discs coupled together. Alternatively a drum encoder could replace the cam and encoder contacts replace the microswitches.

The cam drum 39 is coupled to a shaft encoder 41 by a ratchet mechanism, to be described hereafter, which causes the encoder disc to be rotated once in every day. This encoder disc has its contact portions arranged according to a digital code and these contact portions are driven past a stationary bank of contact 42 connected to the fourth to seventh heating coils of bank IV, which are to give a record of hours, and to the first coil of bank III. The shaft encoder 41 is coupled by a further ratchet mechanism to a shaft encoder 43 so as to drive the encoder 43 one revolution in every 21 days. This encoder 43 has digitally arranged contacts which make contact with stationary contacts 44 to give twenty one unique switching combinations in each revolution. These contacts 44 are connected to the first three heating coils of bank IV to record digitally the day in the week and to the sixth and seventh coils of bank V to record digitally the week in the three week period concerned. The encoder 43 drives a further encoder 45 through a ratchet mechanism such that the encoder 45 carries out one complete revolution in every 63 weeks. This encoder operates in conjunction with a bank 46 of six contacts to obtain 21 switching combinations in every revolution of this encoder. The bank 46 operates the first five heating coils of bank V.

The cam drum 39 can be rotated manually independently of the stepping motor by means of a knob 47, there being a spring loaded clutch 48 to permit this manual rotation independently of the stepping motor. The gear 38 on the output shaft of the gearbox 37 is also coupled, by a gear 49, to a digital time display 50 visible externally of the apparatus. This display comprises a first set of plastic strips 51 for displaying minutes and a second set of plastics strips 52 for displaying hours. This display is of the kind in which each digit displayed is formed by two flexible strips one above the other, the upper one carrying the upper half of the digit and the lower one carrying the lower half of the digit. The two strips making up each digit are pivotally mounted and the upper strips are held in their display positions by spring strips 53 and 54. Gearing 55 is provided to advance one of the strips 52 for every 60 advances of the strips 51.

Figure 9:
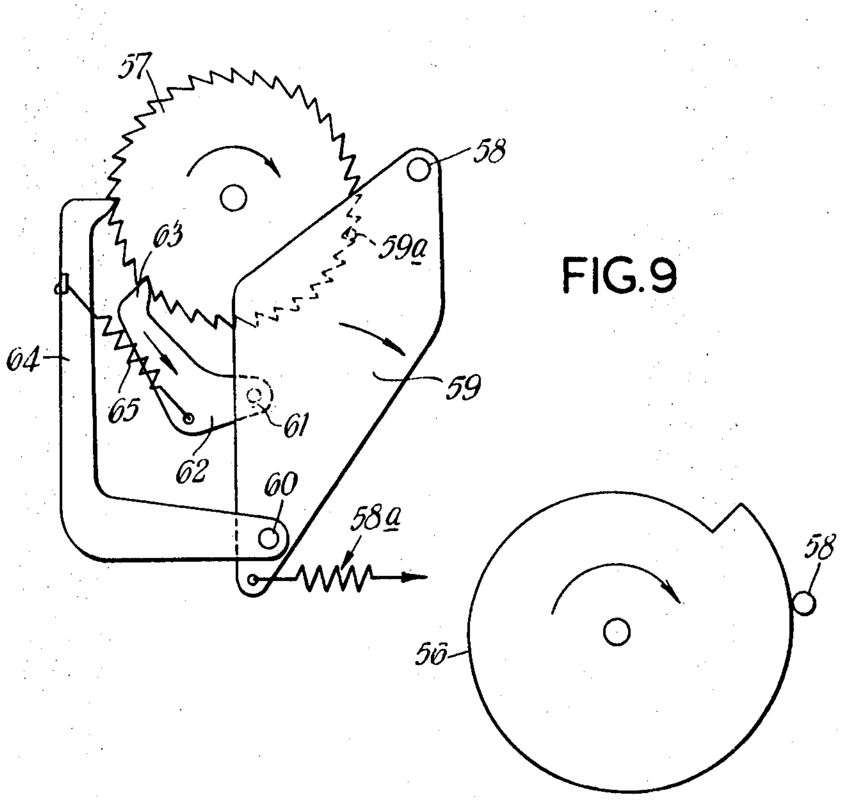
FIG. 9 shows the pawl arrangement used in the clock mechanism of FIG. 8.

FIG. 9 shows the ratchet mechanism interposed between the cam drum 39 and the encoder 41 and also between the adjacent pairs of encoders. The input to this ratchet mechanism is a cam 56 which for convenience is shown separated from the ratchet mechanism in the FIG. but which will be mounted coaxially with the ratchet wheel 57. A peg 58, which is biased by a spring 58*a* onto the cam, is mounted at the free end of a diamond-shaped member 59 pivotally mounted near its opposite end to the chassis of the apparatus. As the cam rotates clockwise, the peg 58 will progressively move radially outwards with respect to the axis of the cam to rotate the member 59 in the clockwise direction about its pivot point 60. Pivotally mounted to the member 59 at a point 61 is a pawl member 62 having a tooth 63 which engages the teeth of the ratchet wheel 57. The clockwise movement at the member 58 draws the pawl member 62 in a direction downwardly and to the right as shown by the arrow in FIG. 8. This movement withdraws the tooth 63 from the ratchet wheel 57. When the peg 58 goes past the highest point of the cam 56, the peg drops radially a substantial distance towards the axis of the cam, whereby the member 59 moves in an anticlockwise direction and drives the pawl member 62 upwardly and to the left in a direction opposite to the arrow shown. The tooth 63 therefore reengages the ratchet wheel 57 and drives the wheel clockwise by one step. Movement by more than one step is prevented by a peg 59*a* carried by the member 59 and engaging the ratchet wheel 57 when the member 59 is in the last part of the anticlockwise movement. The wheel 57 is then held in the new position until the cam 56 has made one more revolution, A locking pawl 64 is provided to ensure that the wheel 57 does not move at the incorrect time. Pawl 64 is biased towards the wheel 57 by a spring 65 which is under tension between the pawl 64 and the pawl member 62 and which is so secured to the pawl member 62 as to apply to it a torque driving the tooth 63 towards the ratchet wheel 57.

The wheel 57 between the cam drum and the encoder 41 has 24 teeth and the other ratchet wheels have 21 teeth.

Figure 10:
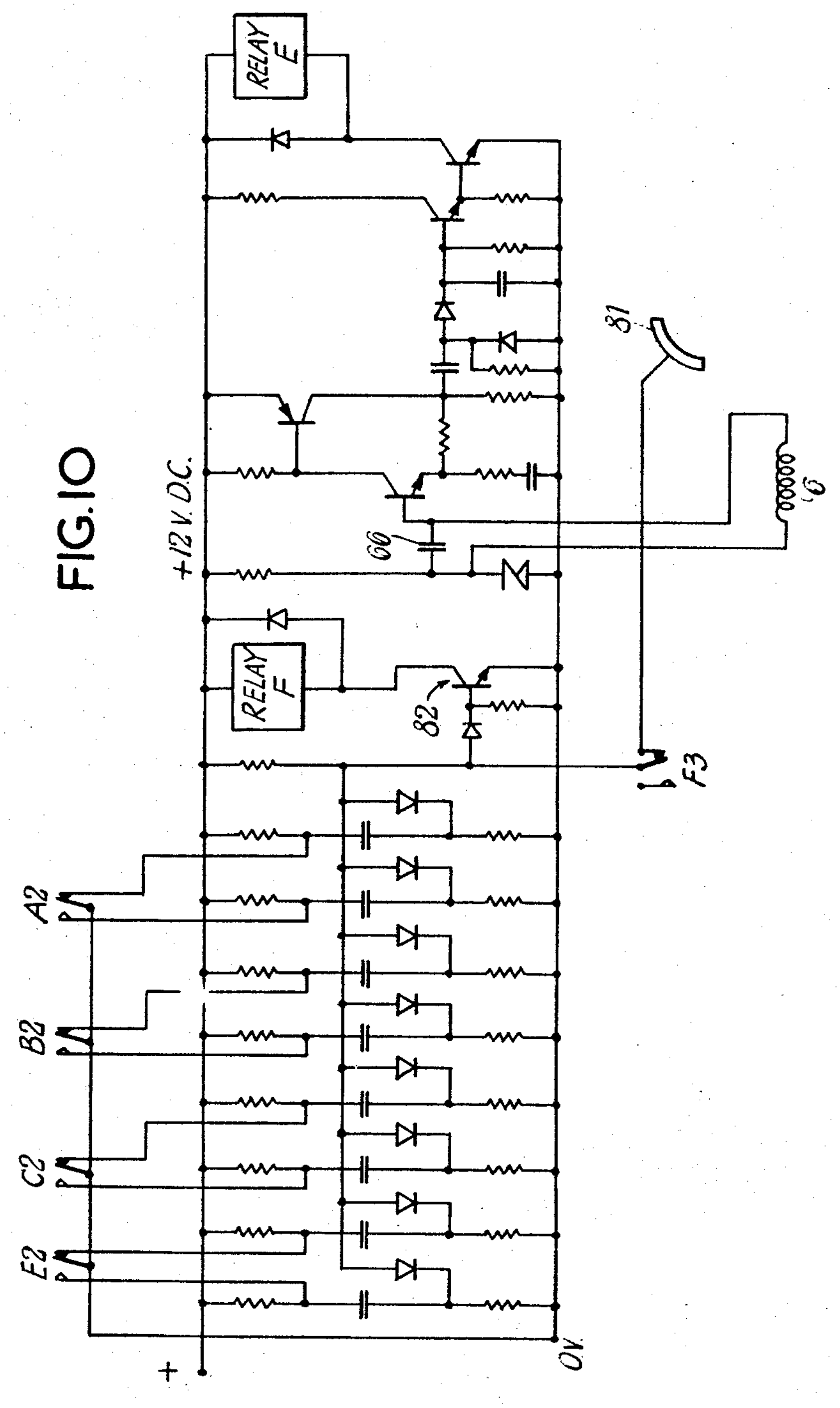
FIG. 10 is a diagram of a circuit of the apparatus for detecting changes in receiver conditions.

FIG. 10 shows the circuit of the apparatus which is coupled to the pickup coil 6. This coil 6 is tuned by means of a capacitance 66 to the frequency of the line frequency generator of the television receiver and when the voltage induced in the coil has reached a predetermined level this voltage, after amplification, detection and further amplification, will energize a relay E. This FIG. also shows a relay F which is deenergized on a change in receiver condition, as will be explained hereinafter.

Figure 11:
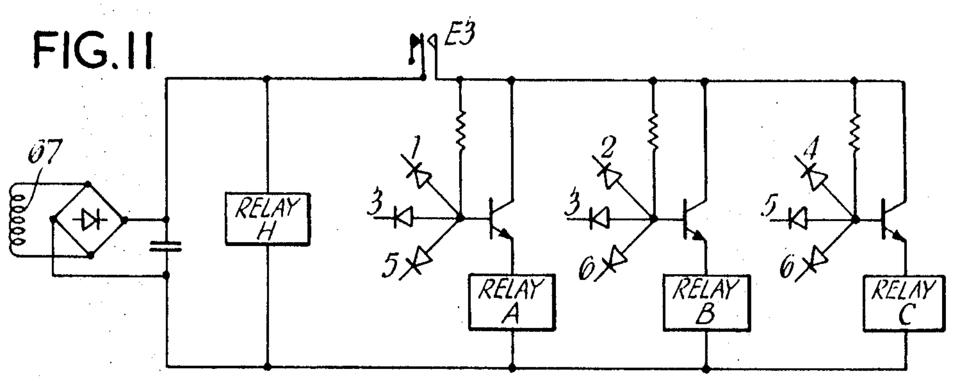
FIG. 11 is a diagram of a circuit for monitoring channel selection and mains failure.

Before describing the apparatus further, it is pointed out that the power needs of the apparatus are obtained from a mains transformer (FIG. 1) the primary of which will, in operation, be connected directly across the mains. The transformer has a number of secondary windings one of which feeds the circuit of FIG. 10. Another of its secondary windings feeds a battery charging circuit for the nickel cadmium battery 8, this circuit comprising a rectifier bridge and a series arrangement of a diode and resistor connected between the bridge output and the battery, as shown diagrammatically in FIG. 1. Upon a mains failure, the diode becomes nonconductive, thereby isolating the charging circuits from the battery. This secondary winding of the transformer is also shown in the circuit diagram of FIG. 11 and is denoted by the numeral 67. The rectifier bridge provides across a plurality of relays of this circuit an operating supply of 6 volts DC. One of these relays, the relay H, is always energized when the mains is on, regardless of whether the receiver is on or not. Furthermore, this circuit is not fed with power upon a mains failure, so that the state of relay H defines whether or not the mains has failed.

The circuit also includes relays A to C for operating the heating coils to record the stations. It is to be seen that these relays are only capable of being energized when the relay E has been energized to close its contact E3 included in this circuit. Thus, when there is no picture at the receiver, these relays are not energized. It is pointed out here that all relay contacts in the figures are shown in their deenergized positions. In the present example, six channels are to be monitored. These relays are included in the emitter-collector paths of respective transistors the bases of which are controlled by potentials obtained from the channel-sensing switch. These potentials are so distributed amongst the transistors, according to the numberings given to the leads to the bases, that binary operation of the relays A, B and C results, as will be clear from the circuit diagram itself. Thus, the relay A will be deenergized whenever channel 1, 3 or 5 is selected, relay B will be deenergized whenever channel 2, 3 or 6 is selected and relay C will be deenergized whenever channel 4, 5 or 6 is selected.

Figure 12:
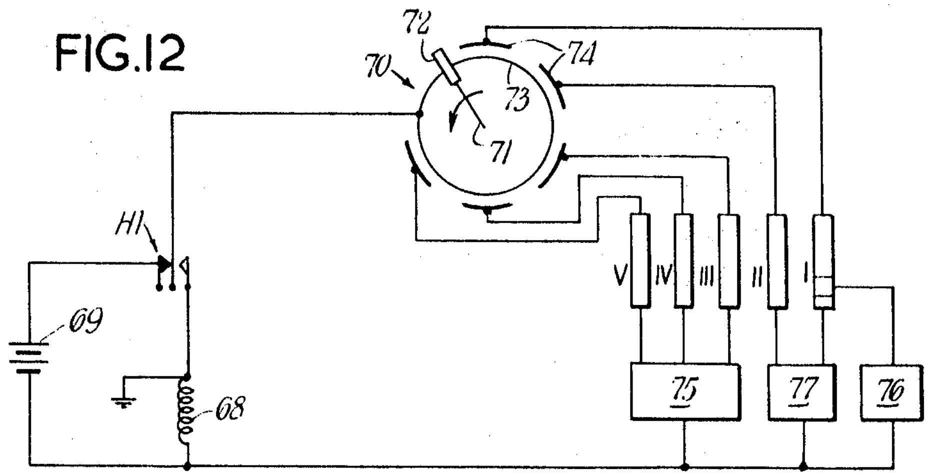
FIG. 12 illustrates diagrammatically the recording control circuit.
Figure 13:
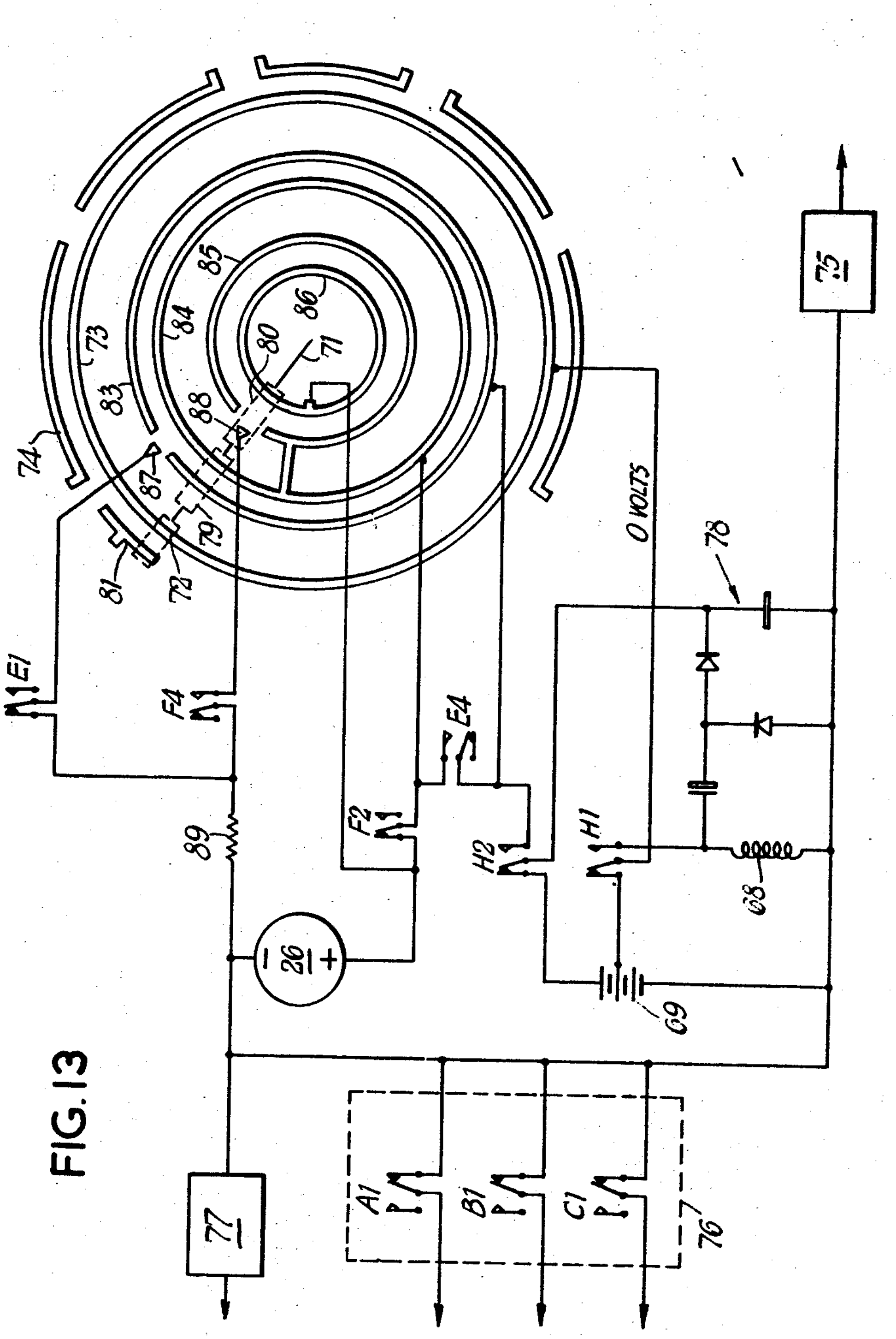
FIG. 13 illustrates diagrammatically a portion of the control circuit of FIG. 12.

FIGS. 12 and 13 show the circuit for controlling the recording of data. FIG. 12 shows this circuit diagrammatically and FIG. 13 shows in more detail one specific portion of the circuit of FIG. 12.

Both of these FIGS. show a further secondary winding 68 of the mains transformer, this winding providing alternating current for energizing the heating coils the five banks of which are denoted by the numerals I, II, III, IV and V in FIG. 12. These figures also show a 2.4 nickel cadmium Deac battery 69 which becomes effective to supply the power for the heating coils should the mains fail. On mains failure, the relay H (FIG. 11) becomes deenergized and its contacts H1 close to connect battery 69 into the circuit. In the present embodiment, the banks of coils are energized in succession, commencing in the present example with bank V followed by bank IV and so on. This sequential operation is caused by a switch 70 which is driven by the motor 26 also used for advancing the tape. The motor drives the rotor 71 of the switch 70 in the anticlockwise direction. The rotor 71 has a contact 72 bridging two rings 73 and 74 of contacts. The ring 73 is continuous and the ring 74 is composed of five separate contacts connected to respective banks of heating coils. Rotation of rotor 71 will therefore cause the banks to be connected sequentially to the power supply. As shown diagrammatically in FIG. 12, the banks of coils III, IV and V are fed with power through an arrangement 75, which includes the contact banks 40, 42, 44 and 46 shown in FIG. 7 and which determine which of the heating coils of these three banks will be energized, thereby to record actual time. A portion of the heating coils of bank I, namely the coils for recording the selected channel, are supplied with power through an arrangement 76 which comprises the contacts A1, B1 and C1 of the relays of A, B and C. The remaining heating coil of bank I and the coils of bank II obtain their power through an arrangement 77 which comprises adjustable links for preselecting the desired household code to be recorded.

FIG. 13 shows the complete switch 70, the motor 26 and their associated circuitry. The direct current supply for the motor 26 is here obtained from a voltage doubler 78 connected across the secondary winding 68. FIG. 13 also shows that the battery 69 has a further cell, of 1.2 volts, which is normally disconnected from the remainder of the circuit by a contact H2 of the relay H. Upon a mains failure, the motor supply will be obtained from the whole of the battery 69, while the supply for the heating coils will be obtained across a portion of the battery which delivers 2.4 volts.

The rotor of the switch 70 carries three electrically separate contacts (shown dotted), these being the contact 72 and two further contacts 79 and 80. The contacts are illustrated as being in the position which they will adopt when the mains is supplying current to the apparatus, but recording is not being carried out. In this position, the contact 72 is bridging a contact 81 and the contact 73, so that zero potential is applied to contact 81. This contact is also shown in FIG. 10 which includes a transistor 82 which is normally in its conductive state and therefore normally energizes the relay F. The contact 80 bridges the contacts 86 and 88 to connect across the motor 26 a braking circuit which includes a resistance 89 and the closed contacts F4 of the relay F. In addition, the contact 79 bridges the contacts 83 and 84 of the switches 70 to bridge contacts E4 of the relay E. It is to be seen that, in this rotor position, the contacts F2 of the relay F are open so that the voltage doubler is not connected to the motor 26. If a change in the condition of the television receiver now occurs, the relay F is deenergized, causing its contact F2 to close whereby current is fed to the motor 26 and the contacts 72, 79 and 80 of the rotor are rotated together in the anticlockwise direction as seen in FIGS. 12 and 13. The relay F is deenergized by means of networks of resistance, capacitance and diodes shown at the left-hand side of FIG. 10. When a change occurs at the receiver, at least one of relays A, B, C and E operates to redistribute the potentials in the networks causing the transistor 82 to become nonconducting and the relay F to be deenergized. These networks, however, only maintain the transistor 82 in its nonconducting condition for about 1 second. Accordingly, the contacts F2 only remain closed for about one second but this is sufficient to cause the motor to move the contact 72 away from the contact 81. The motor 26 must therefore continue to rotate for one revolution even though the relay F becomes energized again shortly afterwards, because contact 80 now bridges 85 and 86 and therefore bridges contacts F2. Contact 81 ensures that relay F remains deenergized until contact 72 has been moved from contact 81.

It is to be seen that the first quarter of a revolution of the motor 26 is accomplished before the contact 72 reaches the first of the outer contacts 74 connected to the heating coil banks. During this quarter turn the motor 26 drives the tape drive roller 18 through a geneva mechanism (not shown) which is designed to remove the coupling between the motor 26 and the drive roller 18 at the end of this quarter of a revolution. The motor then drives the contact 72 successively over the outer contacts 74 to supply power to the heating coil banks successively, whereby the information pertaining to this particular instant is recorded on the stationary tape 1. It is to be noted that, throughout this recording, the contacts 79 and 80 bridge the contacts E4 and F2 to maintain the supply to the motor 26 regardless of the condition of the relays E and F. When recording has been completed, it is seen that the motor has moved the rotor of the switch to a position such that the contact 79 has reached a contact 87. In this position, the contact 79 no longer bridges the contact E4 and instead connects the resistance 89 and the contacts E1 and across the motor. This will have no effect in the situation being considered, because it is assumed that the mains supply is still effective and therefore that the contacts E1 are open. Consequently the motor will continue to rotate so that contact 79 again bridges contact E4, the contact 72 bridges contacts 81 and 83 and the contact 80 bridges contacts 86 and 88. The relay F is at this time in its energized state again, so the contacts F4 are closed and the contacts F2 are open, and are no longer bridged by the contact 80. Thus, the rotor 26 is disconnected from its supply and instead the resistance 89 is connected across the motor to brake it dynamically. The motor thus comes to a standstill with the rotor 71 in the position illustrated in FIG. 13, having caused the recording of information pertaining to the change in receiver condition which initiated the operation of the motor.

The contact 87 of the switch 70 is provided to stop the motor in a similar manner when the mains have failed. Thus, when the mains have failed and when the motor has almost completed one revolution such that the contact 79 has reached the contact 87, the contact 79 no longer bridges the now open contact E4 (the relay E being deenergized). At the same time, the resistance 89 is connected across the motor to brake it rapidly. When the mains supply is restored, the motor will rotate again until the contact 80 reaches the contact 88 and the motor is braked again.

There are a variety of possibilities for obtaining from the receiver itself signals representing the channels selected. The present embodiment is designed to operate in conjunction with switching means which are operated upon channel selection at the television receiver, and it has already been mentioned that this can be achieved in practice by a rotary switch, say a wafer switch, coupled to the tuning shaft of the receiver, for example at the rear end of the tuner itself. In some cases it will be necessary to mount an extension shaft to the back of the tuner to accommodate the switch. The switch itself need not be mounted directly on the tuning shaft or its extension, but can be coupled thereto by coupling means, for example by pulleys. Another suitable form of switch incorporates reed switches which are operated by a permanent magnet carried by an arm which will be coupled to rotate with the tuning shaft of the receiver. The reed switches are preferably mounted so that they can be readily moved to adopt any one of a number of preselected angular positions about the axis of the switch to accommodate the variety of channels used throughout the country. Some television receivers have channel selection by means of pushbuttons, and in this case the switching means could be microswitches or reed switches operated by the pushbuttons.

It will also be apparent that many other modifications can be made to the described apparatus.

For example, the number of digit positions for recording channels can be increased, say to five. Then, the two digit positions of the household code taken up can be transferred to bank V to reduce the number of three week periods recordable.

We claim:

1. An events recorder for recording changes in condition of an apparatus and their times of occurrence, and comprising:
- a stepping motor;
- clock pulse means for supplying said motor with pulses to energize said motor intermittently so that said motor is held in its stationary positions by the remanent magnetism of the motor in the intervals between energizations;
- timing means driven by said motor to provide a measure of actual time;
- input means for receiving signals representing said changes in condition;
- recording means for recording said changes, and their times of occurrence is provided by said clock means, upon a recording medium; and
- standby battery means for maintaining operation of said clock means and to enable recording to continue in the event of a power failure.

2. A recorder as claimed in claim 1, wherein said timing means comprise switch means to give a unique switching combination for each of a predetermined number of movements of said motor.

3. A recorder as claimed in claim 2 wherein said switch means comprise angle encoders.

4. An events recorder as claimed in claim 1, wherein the said recording means records events and times in multibit digitally code words.

5. An events recorder as claimed in claim 1, wherein said recording means records events and times in digitally coded words and said recording medium is driven independently of time.

6. An events recorder as claimed in claim 5, wherein said recording means and recording medium are stationary during recording.

7. A recorder as claimed in claim 1 and comprising sensing means for sensing whether said apparatus to be monitored is on or off.

8. A recorder as claimed in claim 7 for monitoring television receiver use, wherein said sensing means is a pickup coil for picking up oscillations from the line circuit of said receiver.

9. A recorder as claimed in claim 1, wherein said stepping motor is of the synchronous type having relatively movable magnetic circuit arrangements, one of which has two magnetic circuits each with its own energizing winding arrangement, and said clock pulse means comprises a clock pulse generator arrangement for producing in said winding arrangements respective pulse trains of current with the same repetition rate but different phase, the improvement comprises circuitry for producing said pulse trains such that in each pulse train the current pulses have alternating directions and a spacing such that the pulses in one train occur within the intervals between pulses in the other train, so that said motor will be intermittently energized and will be held in its stationary positions by its remanent magnetism in the currentless intervals between energizations.

10. An arrangement as claimed in claim 9, wherein said circuitry comprises a first circuit for producing two pulse trains differing in phase by about 90° and overlapping in time and a second circuit for producing from the latter trains said two trains which energize said motor.

11. An arrangement as claimed in claim 10, wherein said first circuit is a two-stage twisted ring counter.

12. An arrangement as claimed in claim 10, wherein said second circuit is a differentiating circuit.

13. An arrangement as claimed in claim 12, wherein said second circuit comprises for each of said winding arrangements a differentiating circuit having capacitance and inductance, said inductance provided by said winding arrangement.

14. An arrangement as claimed in claim 9, wherein said circuitry comprises:

- a clock pulse generator;
- a two-stage twisted ring counter connected to be triggered by the said clock pulse generator and with its outputs connected to one end of respective ones of said winding arrangements; and
- two capacitive voltage dividers to intermediate points of which the other ends of respective ones of said windings are connected.